INDICATING MECHANISM FOR SORTING DEVICES

Original Filed Jan. 21, 1950

INVENTORS
PASCAL SPURLINO
ALFRED G. KIBLER &
EUGENE H. WOLF
BY Carl Beust
Ayres D. Stoddard
THEIR ATTORNEYS INVENTORS
PASCAL SPURLINO
ALFRED G. KIBLER &
EUGENE H. WOLF
BY Carl Beust
Ayres D. Stoddard
THEIR ATTORNEYS

INDICATING MECHANISM FOR SORTING DEVICES

Original Filed Jan. 21, 1950 4 Sheets-Sheet 3

INVENTORS
PASCAL SPURLINO
ALFRED G. KIBLER &
EUGENE H. WOLF
BY Earl Bennett
Ayres D. Stoddard
THEIR ATTORNEYS

INVENTORS
PASCAL SPURLINO
ALFRED G. KIBLER &
EUGENE H. WOLF

BY Carl Beust
Ayres D. Stoddard

THEIR ATTORNEYS

Patented Aug. 31, 1954

2,688,128

UNITED STATES PATENT OFFICE 2,688,128

INDICATING MECHANISM FOR SORTING DEVICES

Pascal Spurlino, Alfred G. Kibler, and Eugene H. Wolf, Dayton, Ohio, assignors to The National Cash Register Company, Dayton, Ohio, a corporation of Maryland Original application January 21, 1950, Serial No. 139,848. Divided and this application September 13, 1952, Serial No. 309,526

7 Claims. (Cl. 340—286)

The present application is a division of the application of Pascal Spurlino, Alfred G. Kibler, Rudolph J. Moser and Eugene H. Wolf, filed January 21, 1950, and bearing Serial No. 139,848, now Patent No. 2,639,857.

This invention relates to accounting machines and similar business machines, and is directed particularly to a machine having associated therewith record material sorting compartments which may be electrically operated and controlled from an accounting machine, whereby a signal is given to the operator to indicate into which compartment the operator should place the record material relating to the particular transaction being recorded by the accounting machine.

More particularly the present invention relates to a particular novel mechanism or means for causing the indicating means to remain in an indicating position after the completion of the operation of the machine. Moreover the indicator in the present invention is caused to be moved into its indicating position upon the depression of the key associated with that particular indicator. Previously this indicating means was operated only after the differential mechanism of the machine had been positioned.

The main reason for retaining the indicating means in an operated position is to give the operator more time in which to deposit the check in the sorting bin or box associated with the particular indicator which has been operated to indicate that that is the particular compartment into which the check should be deposited, this of course being when checks are being run through the machine and sorted in connection with bank proof operations.

This feature of retaining the indicating mechanism in its operated position is also of value when an error has been made, and that error is immediately discovered by the operator.

The invention is shown embodied in an accounting machine of the type described in the following United States Letters Patent, and reference may be had to them for a complete showing and complete description of standard mechanisms fully disclosed therein, either in the drawings or in the specifications. These patents are: United States Patents Nos. 1,619,796; 1,747,397; and 1,761,542, issued March 1, 1927, February 18, 1930, and June 3, 1930, respectively, to Bernis M. Shipley; No. 2,175,346, issued October 10, 1949, to Maximilian M. Goldberg; No. 2,141,332, issued December 27, 1938, to Charles H. Arnold; No. 1,693,279, issued November 27, 1928, to Walter J. Kreider; No. 2,361,662, issued October 31, 1934, to Pascal Spurlino and Conrad Rauch; No. 2,416,598, issued February 25, 1947, to Pascal Spurlino and Conrad Rauch; and No. 2,417,563, issued March 18, 1947, to Rudolph Moser.

The machine embodying the present invention, as now constructed, is well adapted for use by banks, and especially in the proof departments thereof, where the various items are listed and distributed, and deposits checked for proof balance at the end of the day.

Each bank, in its proof department, keeps an accurate record of each transaction handled by the bank, which transactions generally come from incoming mail, from out-of-town or transit banks, incoming clearings from local banks, and receiving and paying items handled by the tellers of the banks. Many banks require their lists of checks or items paid by another bank to be accompanied by a printed list of checks paid by a bank when these checks are sent back to the bank on which they are drawn.

In order to properly sort the checks as they are recorded in the machine, the machine herein is provided with a plurality of compartments to receive the manually sorted record materials or checks, and is adapted for use in connection therewith, as above mentioned, a central accounting machine of the type commonly used in bank clearing houses, and particularly such as that shown in the above mentioned patent to Spurlino and Rauch, No. 2,361,662.

A separate compartment is used for each bank associated with the clearing house, and all checks drawn or deposit slips credited to each of said banks are manually placed in the appropriate compartments after the amounts and other data appearing thereon have been recorded by the accounting machine.

In order to reduce the possibility of the operators filing such record material in the wrong compartment, the present invention also provides an individual indicator for each compartment, which indicators are normally in the non-indicating position, but which may be selectively moved from a non-indicating position to an indicating position to direct attention to their respective compartments, so that the operator will place the record material in only the selected one of the compartments. Classification keys on the accounting machine, which identify the different banks, are employed to selectively control electrical means for operating the indicators in such a manner that only the compartment corresponding to the particular bank involved in the last registration on the accounting machine is called to the attention of the operator, so that the record material relating to that particular registration will be filed in the proper compartment.

As above mentioned, these indicators in previous machines were not operated until after the machine had started through its operation, or in other words, until after the differential mechanism had been set. However, in the present invention, these indicators are operated immediately upon the depression of the key by the operator, so that the operator may have more time to deposit the check in the proper compartment. Moreover this indicator is not closed at the completion of the operation of the machine, as was previously the case, but is held in an open position for a definite length of time after the machine has completed its operation; therefore, giving the operator more time to deposit the check after having taken the records therefrom and entered them into the machine.

It is, therefore, an object of the present invention to provide a sorting device of the character described, having signaling means in the form of indicators, which are selectively operable by remote control from an accounting machine or the like, and which are maintained in an indicating position subsequently to the completion of the operation of the machine.

Another object of the present invention is to cause the indicators to function immediately upon the depression of the compartment selecting key by the operator.

With these and incidental objects in view, the invention includes certain novel features of construction and combinations of parts, the essential elements of which are set in appended claims and a preferred form or embodiment of which is hereinafter described with reference to the drawings which accompany and form part of this specification.

GENERAL DESCRIPTION

Described in general terms, the machine embodying the present invention is of the type generally disclosed in the above-mentioned Shipley, Goldberg and Spurlino patents. These patents disclose a plurality of totalizers, into which may be distributed various amounts, according to the business system for which the machine is built.

The invention is particularly adapted to be used on a machine as shown in the above-mentioned Spurlino and Rauch Patent No. 2,361,662, which machine is what is known as a bank proof machine, used in banks, and in which the totalizers are adapted to receive the many and various items constituting individual transactions that are handled in the ordinary banking business.

The machine keyboard is arranged for taking care of all business in connection with the bank, whereby all transactions handled by the bank may be listed in this machine and a record made of each of these transactions. The machine is, therefore, provided with the usual banks of amount keys of sufficient capacity to take care of the ordinary business of any bank.

There are also three rows of what are known in the art as control keys for the purpose of selecting the various totalizers for the distribution of the transactions entered in the machine. These banks of keys also control the selection of sorting compartments into which the checks are to be manually sorted, as the data is recorded therefrom into the machine.

The sorting racks which are used in connection with the present invention are of the general type shown in the Spurlino and Rauch Patents Nos. 2,361,662 and 2,416,598.

Figure 9:
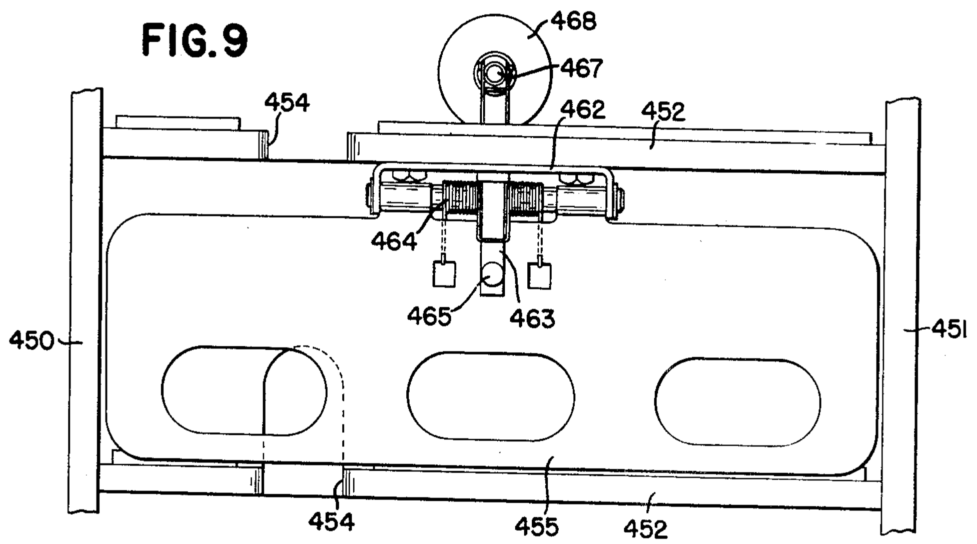
Fig. 9 shows one of the sorting compartments with the indicator in its normal position, in which the compartment is closed against the insertion of a check being manually sorted.

However, the indicator devices in the present invention are larger than the indicator devices shown in the Spurlino and Rauch patents above mentioned. In those patents, the indicator devices do not cover the entire tops of the sorting compartments, whereas in the present invention, as particularly shown in Figs. 8 and 9, the indicator devices cover substantially the entire tops of the sorting compartments, and the indicator devices in the present machine have a control which has been herein termed a delayed action device, which causes the indicator to remain open for a certain period of time after the completion of the operation of the machine. This gives the operator more time to deposit and sort the checks in the indicated and selected compartments than was previously had in connection with the earlier machine, such as that disclosed in the above-mentioned Spurlino and Rauch patents. Moreover, the indicators in the present invention are so controlled as to be immediately operable upon the depression of the selecting keys which are, for example, the keys in rows 3 and 4, shown diagrammatically in Fig. 1, whereas in the earlier machines the indicators do not operate until after the differential mechanisms have started to move.

DETAILED DESCRIPTION

*Keyboard*

Figure 1:
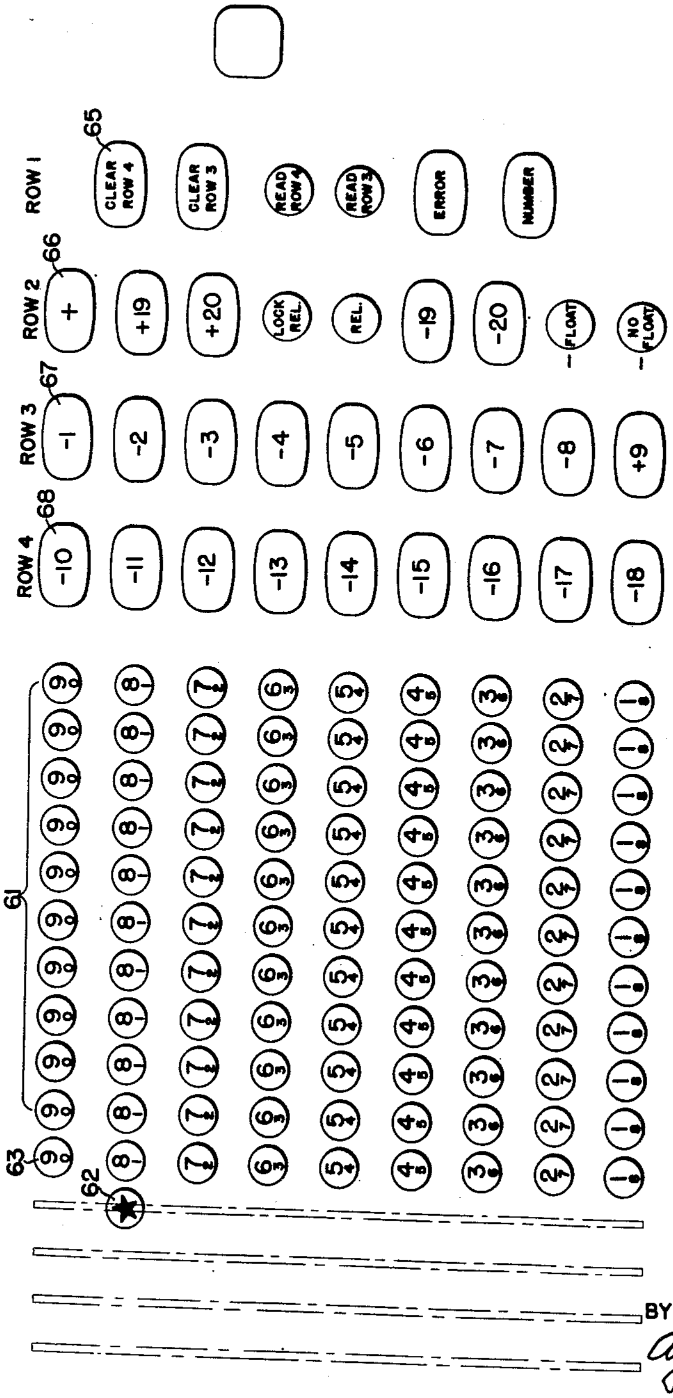
Fig. 1 is a diagrammatic view showing a portion of the keyboard of the machine with which the present invention is adapted to be used.

The keyboard of the machine is shown, partly in diagrammatic form, in Fig. 1, and includes ten rows or banks of amount keys 61. A "Star" key 62 is shown in the 8 position in the right-hand row of the check counting differentials which are illustrated and described in the parent application, but which are not shown in this divisional application.

A row of keys 63 is normally used, as described in the parent case, to control the printing of data set upon the keys in this bank. This is what is known in the art as a combination bank and, as above mentioned, normally is used as a print bank. However, when the "Star" key 62 is depressed, this bank of keys 63 is transformed from a print bank into a bank whereby its differential mechanism is controlled by the highest order of the add-subtract totalizer, as is fully illustrated and described in the parent case, but which is not further described in this particular divisional application.

Now, beginning at the right side of the keyboard, in Fig. 1 there are four rows of keys 65, 66, 67 and 68, which are marked Row 1, Row 2, Row 3, and Row 4, respectively. The keys 65 are total controlling keys, and the keys 66, 67 and 68 control the machine for various types of operations.

For illustrative purposes, the keys of the third and fourth rows are designated for the purpose of entering debits from various local banks and transit banks.

Prior to entering these debits, the total amount of the entire block or debit is first entered in the crossfooter, as set forth in the parent application, by setting such amount on the amount key 61 and then depressing the plus key 20 in row 2, when the transaction relates to customers' deposits. This, of course, takes place after the amount of the total has been set up on the keyboard. This total goes into the plus side of the crossfooter and as each of the various debits is entered into the machine, which debits may be distributed into any one or all of the totalizers associated with the keys in row 3, and at the same time each debit is subtracted from the crossfooter so that at the end of the entry of the several items of this particular batch, the crossfooter should be clear which, of course, is proof that the items were properly listed and recorded. These items may come from the teller's cage, and usually are the deposits made by customers having checking accounts in the bank.

There is also associated with the machine, as above mentioned, a sorting device, consisting of boxes or compartments into which the checks are placed by the operator, after having been listed in the machine. Each of the bins or sections into which the checks are to be placed after they have been listed carries, in the present instance, an electrically operated indicator, which is operated immediately upon depression of the keys of rows 3 and 4.

The operator then deposits the check in the bin which has been selected, as indicated by the operation of the indicator.

*Machine release mechanism*

Figures 5, 6, 7, 8:
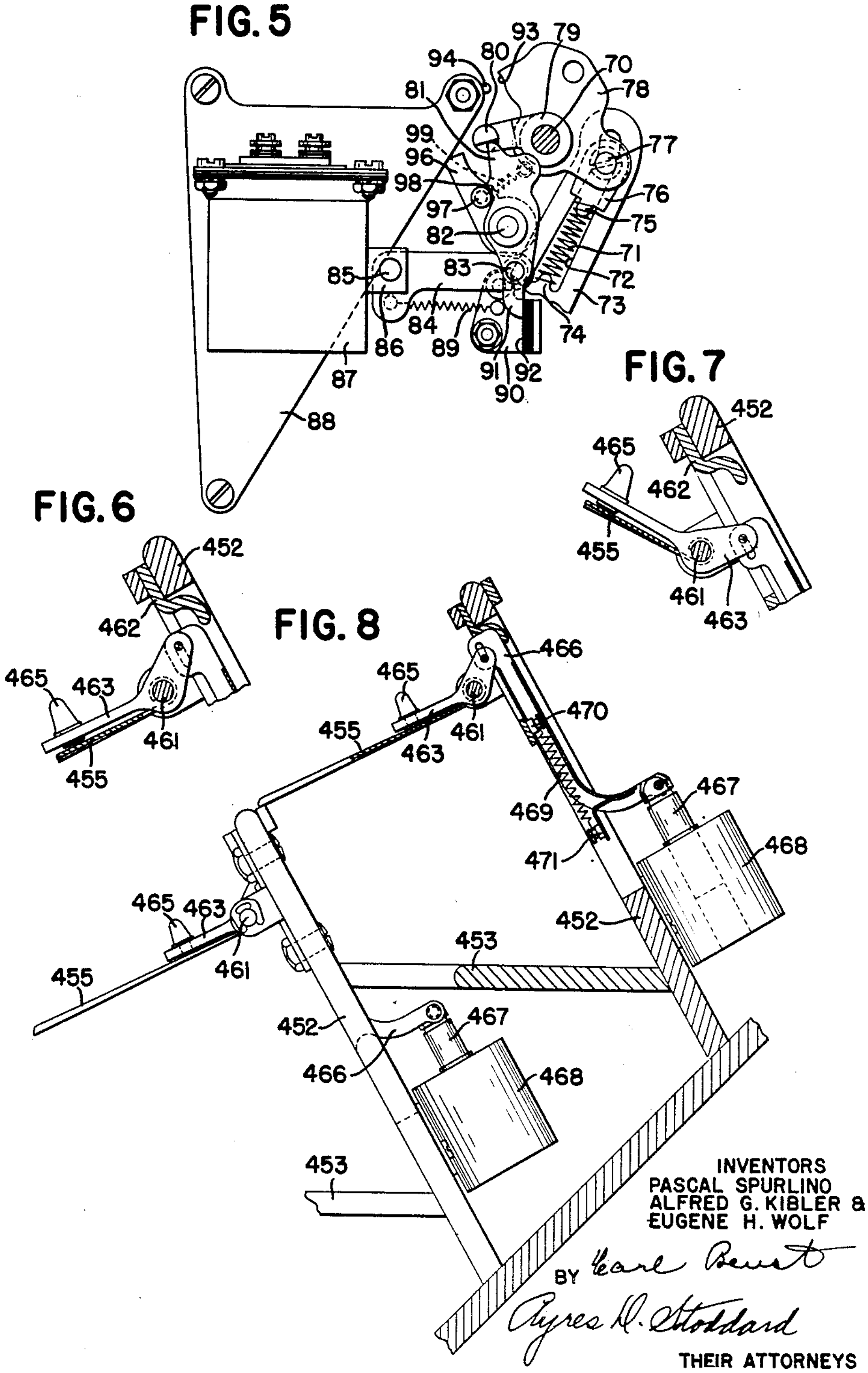
Fig. 5 shows a portion of the machine releasing mechanism, the tripping mechanism for said machine releasing mechanism, and the electrical means which operates said tripping mechanism.
Fig. 6 shows a portion of a compartment indicator and a part of its operating mechanism in normal position.
Fig. 7 shows the same mechanism that is shown in Fig. 6, but in a moved position.
Fig. 8 shows one of the sorting compartments with the indicator in its non-indicating position, and also shows an indicator for an adjacent compartment, also in its non-indicating position.

In Fig. 5 there is shown the machine release mechanism, including a release shaft 70, a part of the mechanism for rocking it in a counter-clockwise direction to release the machine, the machine release shaft tripping mechanism, and the electrical device which operates said machine release shaft tripping mechanism.

The means for restoring the shaft 70 to its normal position is not shown herein, but is identical with that which is fully illustrated and described in the above-mentioned Shipley Patent No. 1,619,796, and if a description thereof is desired, reference may be had to that patent for the same.

The machine release shaft 70 (Fig. 5) is adapted to be moved in a counter-clockwise direction of a strong spring 71, mounted in a slot 72 of a link 73, in exactly the same manner as is fully illustrated and described in the above mentioned Shipley Patent No. 1,619,796. The spring 71 sets on a finger 74 of the link 73, and also engages the fingers 75 of arms 76 (only one of which is shown), which arms are mounted on each side of the link 73. A stud 77 carried by the arms 76 projects into an arm 78, which is secured to the machine release shaft 70. Also secured to the machine release shaft 70 is an arm 79 carrying a flat-sided pin 80.

The shaft 70 is held in its normal position by the upper end of a trip lever 81, which is engaged by the flattened pin 80 and held in such engagement by the spring 71. This tripping lever 81 is pivoted on a stud 82, carried by the left side frame of the machine (not shown).

It might be well to state here that the link 73 and arm 78 are mounted adjacent the right side frame of the machine in their normal positions.

The tripping lever 81 carries a stud 83, by means of which said tripping lever 81 is connected to a link 84. This link 84 is connected by means of a long stud 85, to a solenoid core 86 of a solenoid 87 mounted on a bracket 88, secured to the left side frame (not shown). A spring 89 connected to the link 84 and to a bracket 90, secured to the left side frame, normally maintains the parts in the positions shown in Fig. 5, whereupon the upper end of the tripping lever 81 is beneath the flat stud 80 of the arm 79, which it will be remembered is secured to the machine release shaft 70. The finger 91 of the lower end of the tripping lever 81 is normally held by the spring 89 in contact with a resilient sound-deadening block 92 of rubber or similar material, secured to the bracket 90.

By means to be hereinafter described, the solenoid core 86 is moved to the left, as viewed in Fig. 5, in the direction of the arrow, thus pulling the link 84 in the same direction, which rocks the tripping lever 81 clockwise, removing its upper end from beneath the flat pin 80, whereupon the strong spring 71, through the medium of the stud 77 and the arm 78, rocks the machine release shaft 70 counter-clockwise until the surface 93 of the arm 78 contacts a limiting pin 94, carried by the machine right side frame (not shown).

Such movement of the machine release shaft 70, as has been clearly illustrated and described in the above-mentioned Shipley Patent No. 1,619,796, closes the circuit through a machine operating motor, thus driving the machine through a normal cycle of operation.

The solenoid 87 is energized upon the closing of certain micro switches described in connection with the particular part of the control of the operation of the release of the machine by certain of the control keys.

In order to prevent an operator from accidentally or intentionally holding down any one of the operating keys, that is, keys which when depressed cause the machine to be released and to be driven through an operation of the machine (and thus causing an intermediate second operation of the machine), there is provided the usual non-repeat pawl 96 pivoted on the stud 82 and having a stud 97 held in contact with a surface 98 of the tripping lever 81 by means of a spring 99.

The pawl 96 is slightly higher than the upper end of the tripping lever 81 and consequently when the pin 80 is released by the tripping lever 81 and moved downwardly under the tension of the spring 71, it is moved downwardly to the left of the tripping lever 81 and to the right of the non-repeat pawl 96, thus holding the tripping lever 81 in its released position at the end of the operation of the machine, and until after the arm 79 is restored clockwise to a position slightly above that shown, and then finally restored to the position shown in Fig. 5. At the time the arm 79 is slightly above the position shown, the circuit through the solenoid 87 is broken, and consequently the spring 89 can restore the solenoid core 86 and the link 84 to the right, to the position shown, thus moving the tripping lever 81 to the position shown, so that when the arm 79 finally assumes the position shown, the flattened pin 80 will be directly above the upper end of the tripping lever 81.

*Transaction keys*

Only one of the transaction or control banks of keys of rows 2, 3 and 4, has been shown, as the keys in these banks are all substantially the same, and are all mounted in substantially the same manner. Therefore, the row 3 bank of keys 67 has been shown in Fig. 2. This particular row has been chosen because of the fact that the keys in this bank control a micro switch, which in turn is in circuit with the above described solenoid 87, to in turn control the release of the machine when said solenoid operates the tripping mechanism above described.

Since the rows of keys 66, 67 and 68 are all identically mounted, it is believed that the description of the bank of keys 67 will suffice for all. With this in mind, and referring particularly to Fig. 2, there is shown a key frame 111, mounted on rods 112 and 113, carried by the machine side frames, in exactly the same manner as shown in the above-mentioned patents, and particularly the above-mentioned Shipley Patent No. 1,619,796.

Each key 67 of this transaction bank in row 3 (Fig. 2) carries a pin 114, each pin adapted to cooperate with an associated slot 115 of a releasing bar 116, pivoted at its upper end to an arm 117, pivoted at 118 on the key frame 111, and to an arm (not shown), pivoted near the lower end of the key frame 111. Associated with each of the keys 67 is a coil spring (not shown), which is of the usual type, and which is adapted to hold the keys in their normal undepressed positions in a manner well known in the art. A spring (not shown) maintains the bar 116 in the position shown in Fig. 2 against the key pins 114 in the normal positions of the parts, in a manner which is well known in the art.

When the key 67 is moved into its depressed position, and latched in that position by means to be later described, the arm 117 (Fig. 2) by means of a pin 121 carried thereby, contacting a finger 122 of an arm 123, pivoted on a rod 124, rocks said arm 123 in a counter-clockwise direction. The arm 123 also carries a pin 126, which is connected to a link 127, pivoted at 128 to an arm 129, pivoted on the machine release shaft 70.

Figures 2, 3, 4:
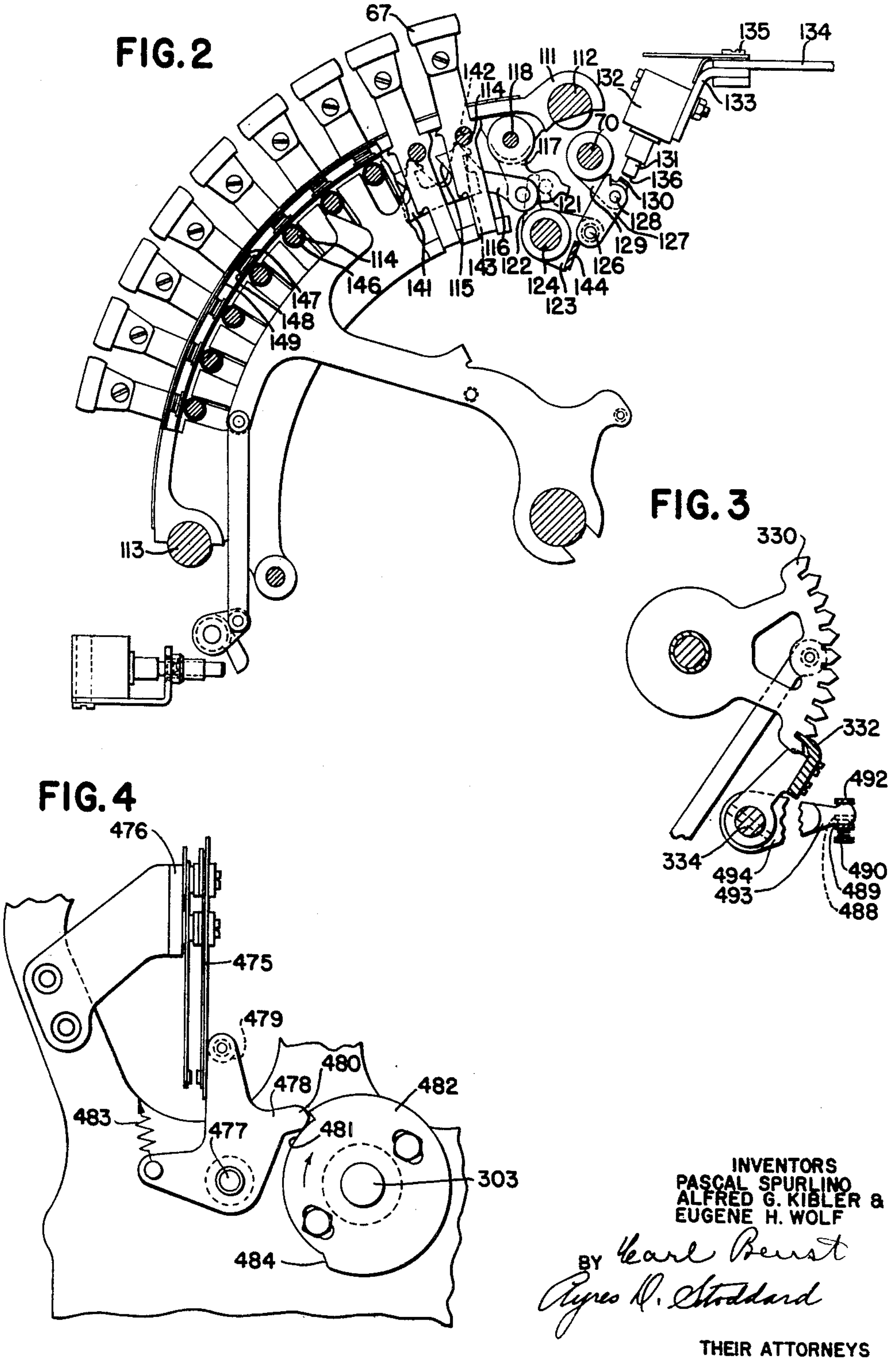
Fig. 2 is a side elevation of one of the transaction banks, particularly what is known as row 3, and shows the mechanism in connection with this bank which determines or controls or assists in the control of the release of the machine.
Fig. 3 shows a part of the alining mechanism for the banks of differential mechanisms in connection with the amount keys, and also shows the switches for controlling the holding circuit for the compartment indicator operating solenoid and how these switches are controlled by the differential aliner mechanism.
Fig. 4 is a detail view showing an electrical switch operable to complete the holding circuit for the sorting box indicator operating magnet.

The arm 129 has a lip 130, adapted to cooperate with a switch plunger 131, which operates a micro switch 132 supported on a bracket 133. The bracket 133 is secured through a machine frame race 134 by means of screws 135. When the keys 67 are in their normal undepressed positions, as shown in Fig. 2, there is a clearance indicated at 136, between the lip 130 and the switch plunger 131.

Upon depression of any one of the keys 67, its pin 114 moves the bar 116, and rocks the arm 117 clockwise (Fig. 2) and the pin 121 rocks the arm 123 counter-clockwise. This causes the link 127 to raise and to rock the arm 129 counter-clockwise. While this is occurring, the pin 114 of the key 67 is moving a retaining detent 141 downwardly against the tension of a spring (not shown) in the usual manner, and just as soon as a flattened part 142 of the pin 114 passes beneath the nose of the detent 141 and gets beneath a shoulder 143, the spring moves the detent 141 upwardly again into the position shown in Fig. 2, thus retaining the depressed key 67 in its depressed position in the usual manner.

The relations of the parts, that is, the shoulder 143 to the clearance 136, are such that the detent 141 latches the key 67 in its depressed position, just as the lip 130 touches the end of the micro-switch actuating plunger 131. At this time the key is further depressed, whereupon the arm 129 is rocked still further in a counter-clockwise direction to move the switch plunger upwardly to a distance sufficient to close the contacts of this micro-switch 132, which are normally in an open condition. The usual key spring then returns the key 67 slightly upward until the flattened part 142 contacts the shoulder 143, which retains the key in its depressed position. Such upward movement of the key 67 is sufficient to permit the arms 129 and 123 to rock slightly clockwise, thus removing the lip 130 from the plunger 131 whereupon the micro-switch 132 opens and thus breaks the circuit to the solenoid 87, which is thus deenergized.

When this micro-switch 132 is closed it completes a circuit to the previously described solenoid 87, which has for its purpose the function of operating the machine release tripping mechanism so that just as soon as one of the keys 67 is completely depressed the machine releasing mechanism is released and can function to cause the machine to go through the normal cycle of operation.

The keys 66 of row 2 and the keys 68 of row 4 are each associated with a release bar identical with the release bar 116, whereupon the depression of certain of the keys 66 and any one of the keys 68 will operate the micro-switch 132 as do the keys 67 of row 3 in the manner above described. To accomplish this the arm 123 is connected by a bail 144 (Fig. 2) to arms associated with the keys 66 and 68, which arms are substantially like the arm 123, so that when certain of the keys 66 or any one of the keys 68 is depressed, the micro-switch 132 will be closed in the manner above described in connection with the key 67, and for the same purpose.

As has been previously mentioned, there is employed in connection with the present invention a group of sorting compartments, which form a unit, and which may be either attached to or separated from the accounting machine. These compartments are selected for the operator to manually sort the checks therein by use of keys 67 of row 3 and the keys 68 of row 4, and also certain of the keys 66 of row 2. Such keys 66, 67 and 68 are used to perform all of the usual functions of such types of keys in the accounting machine, namely, release the machine for operation and control the selection of the totalizers and adjustment of the printing and indicating mechanisms.

Said keys 66, 67 and 68, as above mentioned, also are arranged herein to perform the added function of selectively controlling the operation of indicators on and used in connection with the sorting compartments in such a manner as to indicate to the operator the compartment into which she should file record material from which she has entered data into the accounting machine, said compartment of the sorting device corresponding to the classification key operated.

Therefore, each of the keys 67 carries on its pin 114 an insulating roller 146 (Fig. 2) which serves to hold open contacts 147 and 148 while the key 67 is in its normal undepressed position. Both of the contacts 147 and 148 are suitably insulated from their respective mountings. The contact 147 has a normal tendency to move downwardly to engage the contact 148, but is restrained from doing so by the undepressed key 67, above described. A contact bar 149, suitably mounted in the key frame 111, is connected to all of the contacts 147. For a further detailed description and illustration of these contacts reference may be had to the Spurlino and Rauch Patent No. 2,416,598 above mentioned.

The bank of transaction or compartment selecting keys 68 of row 4 are identical with those keys 67 of row 3, which have been previously described, and therefore no further description thereof need be given of them herein.

*Sorting compartments*

As has been previously stated, the present invention includes a sorting device comprised of a housing or cabinet containing one or more rows of filing compartments located in stepped arrangement. The sorting device is similar to that illustrated and described in the above mentioned Spurlino and Rauch Patent No. 2,416,598, and will be but briefly described insofar as the sorting device is concerned.

In the present case more particular attention is directed to the control of the operation of the indicating means or signal, wherein the indicating means or signal is retained in an operated position a longer time than in previous machines, such as disclosed in the above-mentioned Spurlino and Rauch patent, to give the operator more time in which to deposit the checks into sorting bins or compartments associated with the particular indicator which has been operated, to indicate that that is the particular compartment into which the checks should be deposited, this of course, being when checks are recorded in the machine and sorted in connection with bank proof operations.

This sorting device will now be described, it being illustrated in Figs. 6 to 9 inclusive. These compartments are formed by side walls 450 and 451, with slanting partitions 452 and bottoms 453. The partitions 452 have slots 454 formed therein, whereby the operator may at any time remove assorted records or checks from the compartments. The compartments are arranged in steplike fashion, which facilitates the convenient filing of the record material therein.

Each compartment is provided with a signaling member or indicator 455 (Figs. 6 to 9) to act as a signal to the operator to designate into which compartment said operator should file or place the check.

This indication is accomplished by the upper side of the indicator 455 being finished in the same color as the compartment, while the under side of the indicator is finished in a contrasting color to act as a signal to the operator. Upon operation of the indicator the contrasting color of the under side thereof will be exposed to view, thereby indicating to the operator which compartment should receive the recorded material.

The present indicators 455 are somewhat larger than those of the above-mentioned Spurlino and Rauch patent in that in the present case these indicators 455 cover substantially the entire top of the compartment, thus preventing the operator from getting the check in the wrong compartment by accident because there is not sufficient room between the edges of the indicators 455 and the backs of the partitions 452 to get a check in unless the operator deliberately tries to do so, which of course is not the normal or proper operation.

The indicator 455 is secured to a shaft 461, loosely mounted on a bracket 462 secured to the partition 452. Freely mounted on the shaft 461 is a bell crank 463, one arm of which is operatively connected to the indicator 455 by means of a torsion spring 464. The spring 464 is mounted around the shaft 461 and straddles one arm of the bell crank 463, and also has both of its ends hooked over the indicator 455, as is clearly shown in Fig. 9. The purpose of this flexible connection between the bell crank 463 and indicator 455 is three-fold; namely, silencing the noise; avoiding vibration and rebound; and providing quicker and smoother action. With such an arrangement the solenoid does not have to overcome the inertia of the indicator instantly at the beginning of the movement.

Through such flexible connections the bell crank 463 and the indicator 455 are adapted to move as a single unit. The arm of the bell crank 463, which coacts with the indicator 455 carries a rubber bumper 465, which extends beyond the upper and lower sides of such arms as is shown in Figs. 6 and 7. The lower portion of the rubber bumper 465 is normally held in contact with the indicator 455 by the torsion spring 464, while the upper portion of the bumper is adapted to strike the bracket 462 when the bell crank 463 is rocked clockwise to move the indicator 455 into effective or indicating position. The other arm of the bell crank 463 is connected by a link 466 to an armature 467 of a solenoid 468, mounted on the partition 452. The partition 452 is slotted to accommodate the arm of the bell crank 463 and a portion of the link 466 so there will be no interference between the parts and the record material deposited in the receiving compartment.

For the same reason, the lower portion of the link 466 and the solenoid 468 are located below the bottom 453 of the compartment, as is illustrated in Fig. 8. A tension spring 469, fastened at one end to a stud 470 in the bracket 462 and at its other end in a stud 471, carried by the link 466, normally serves to hold the link 466 and the bell crank 463 in the positions shown in Figs. 6 and 8, thereby maintaining the indicator 455 in its ineffective or non-indicating position, as shown.

Upon energization of the solenoid 468 the armature 467 is forced downwardly and through the link 466 rocks the bell crank 463 clockwise until the latter is stopped by the rubber bumper 465 striking the bracket 462. The bell crank 463 will at this time, through the flexible connection formed by the present spring 464, between the bell crank 463 and the indicator 455 rock the indicator 455 clockwise about the shaft 461 until it reaches a signaling or indicating position, whereupon its contrastingly colored under-surface is exposed to the view of the operator, thus attracting the operator's attention to its respective compartment, for the purpose of having record material deposited therein by the operator.

In former machines, and particularly that shown and described in the above-mentioned Spurlino and Rauch patent, the indicator remains in its effective or indicating position only until the control key has returned to its normal undepressed position which de-energizes the solenoid, which occurs near the end of the operation of the accounting machine.

However, in the present case the de-energization of the solenoid is delayed for a definite period in order to give the operator more time to file the record material in the compartment. This so-called delayed action and the de-energization of the solenoid will be hereinafter described.

However, when the solenoid is de-energized the spring 469 moves the link 466 upwardly and rocks the bell crank 463 counter-clockwise, which movement of the bell crank will likewise be transmitted to the indicator 455 to return the latter to its normal non-signaling or non-indicating position.

The magnets or solenoids 468 are energized upon depression of the keys 67 and 68 in rows 3 and 4, respectively, there being one compartment associated with each one of those keys, and also with the keys 66 of row 2 numbered 19 and 20.

*Wiring diagram and electrical controls for the delayed action of the compartment indicators or signal devices*

Figure 11:
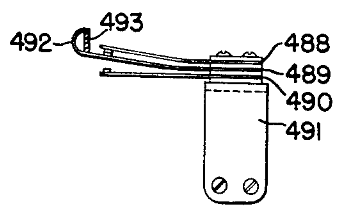
Fig. 11 shows the switches for controlling the holding circuit for the compartment indicator operating solenoid.

Before describing the circuits for causing the operation of the compartment indicators and the delayed action circuit which causes the indicator to remain in its indicating position after the completion of the machine operation, there are two switches and means for operating them, which are in the circuit and will now be described. These switches are shown in Figs. 3, 4 and 11. Fig. 4 shows the switch and the means for operating the switch, which is in the holding circuit to prevent release of the indicator operating magnet or solenoid 468. The other switch, which is shown in Figs. 3 and 11, is a switch operated by the indicator liner to close the circuit through a condenser which makes contact through a magnet to cause the magnet to operate a switch in the holding circuit for the indicator operating magnet 468.

The above holding switch 475 is shown in Fig. 4, and is mounted on a bracket 476, supported by the machine side frame. This switch 475 is normally open.

Pivoted on a stud 477 on the machine side frame is an arm 478 having an insulating roller 479, normally contacting the switch 475. The arm 478 has a finger 480, normally held by a spring 483 against a low surface 481 of a cam 482, fast on the main operating shaft 303 of the machine.

As the cam 482 rotates clockwise, a rise 484 on the cam rocks the arm 478 counter-clockwise a distance sufficient to cause the insulating roller 479 to close the contacts of the switch 475. At the end of the operation of the shaft 303, the spring 483 rocks the arm 478 clockwise to its normal position to cause the finger 480 to again assume its position on the low surface 481 of the cam, whereupon the switch 475 will open.

The switch which is operated by the indicator aliner line is shown in Figs. 3 and 11, and includes three switch plates 488, 489 and 490, mounted on the bracket 491, supported by the machine frame.

As shown in Fig. 11 the circuit is closed between the blades 488 and 489 and opened between the blades 489 and 490.

The blade 489 is provided with a hook 492 and engages an arm 493 of the insulating material, which in turn is carried by an arm 494 secured to the indicator liner shaft 334.

When the aliner 332 is disengaged from the segment 330, which occurs at approximately between 17 and 42 degrees time of movement of the shaft 303, as has been clearly illustrated and described in previous patents in connection with the alining of the amount differential mechanism, particularly the Shipley Patent No. 1,619,796; the shaft 334 and consequently the arm 494, and insulating arm 493, are rocked clockwise, thus breaking the circuit between the blades 488 and 489, and closing the circuit between the blades 489 and 490.

Figure 10:
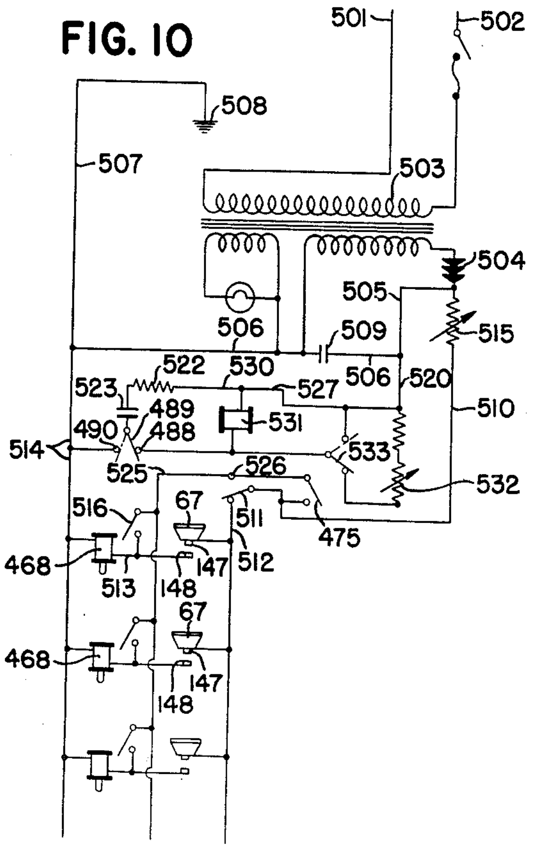
Fig. 10 shows a wiring diagram of the controls for controlling the delayed action on the compartment indicator.

In the wiring diagram in Fig. 10, the blade 488 is represented by the small circle marked 488, the blade 489 by the line marked 489, and the blade 490 by a small circle marked 490.

The circuit for controlling the delayed closing of the compartment indicator will now be described.

Referring particularly to Fig. 10, the current is derived from supply lines 501 and 502. This current is 110 volts A. C., and goes to a transformer 503. In the circuit is a rectifier 504, which changes the alternating current to direct current. From the rectifier the circuit runs through line 505, line 506 and line 507, to the ground 508. In this circuit there is provided a condenser 509 to reduce the transformer humming.

Upon depression of, for example, one of the keys 67, the contacts 147 and 148 are closed, whereupon a circuit is completed from the rectifier 504 through line 510, switch 511, line 512, contacts 147 and 148, line 513, through magnet 468, to line 514, and thence line 507 and the ground 508. This circuit energizes the magnet 468 which, as previously described, raises the indicator 455 on the compartment, which corresponds to the operating key 67. The energization of magnet 468 closes the switch 516, which is held closed after the key 67 is released. In this circuit there is an adjustable rheostat 515 to control the speed of the opening of the indicator to in turn control and reduce the noise accompanied by the opening of the indicator 455.

When the indicator aliner 332 is disengaged from the segment 330 (Fig. 3) the switch plate 489 is operated and moves to the dot and dash line position shown in Fig. 10, thus completing a circuit from the line 505 through 520, line 527, resistor 522, condenser 523, through switch plates 489 and 490 to line 514, and thence to line 507 and to the ground 508. This last circuit just described charges the condenser 523. During the time this condenser 523 is being charged, the cam 482 (Fig. 4), through the lever 478 closes the switch 475, which completes the holding circuit for the magnet 468 as follows: From the line 510 through switch 475, line 525, switch 516, which was closed by the energization of the magnet 468, thence through the magnet 468, line 514 and line 507 to the ground 508. This holding circuit insures that the relay 468 will remain energized until after the switch 511 is moved from the position shown in Fig. 10 into contact with a switch plate 526 designated by a circle.

When the indicator aliner 332 is moved back into engagement with the segment 330, the switch plate 489 is moved from the dot and dash line position back to the position shown in Fig. 10, whereupon the condenser 523 leaks current back through line 530, through magnet 531, to energize this last magnet 531. The energization of this magnet 531 operates the switch 511, above mentioned, to cause it to move from the position shown in Fig. 10 into contact with the switch plate 526, which as above mentioned, is indicated by a circle. When this occurs, the holding circuit for the magnet 468 is as follows: From line 510, through switch 511, plate 526, line 525, switch 516, through magnet 468, lines 514 and 507, to the ground 508. This magnet 531 thus holds the switch 511 in position to complete the last-mentioned holding circuit for the magnet 468 until all of the current has leaked out from the condenser 523, thus causing the magnet 468 to remain energized after the completion of the operation of the machine. In circuit with the condenser 523 is an adjustable rheostat 532, which may be manually set to control the speed of the leakage of the condenser 523. In this same circuit is a switch 533, which is retained in the position shown in circuit with the rheostat 532 and the condenser 523 when it is desired to cause the magnet 468 to delay the closing of the indicator 455.

The magnet 531 retains the switch 511 in its operated position a length of time sufficient to cause the indicator 455 to remain in the open position, between 15 and 30 seconds after the completion of the operation of the machine.

Should it be desired to have instantaneous closing of the indicator 455, the switch 533 is moved from the full-line position to the dot and dash line position, as shown in Fig. 10, thus breaking the circuit so that the switch 511 will not be operated because of the fact that there will be no energization of the magnet 531.

Since all of the various mechanisms and their special functions have been fully described in detail throughout the specifications, it is not thought necessary to give any detailed operation of the mechanism as a whole at this time.

While the form of mechanism herein shown and described is admirably adapted to fulfill the objects primarily stated, it is to be understood that it is not intended to confine the invention to the one form or embodiment herein shown and described, for it is susceptible of embodiment in various forms.

What is claimed is:

1. An indicating mechanism for a sorting device, having a filing compartment adapted to receive manually sorted record material, consisting of the combination of a machine; a manipulative device to control the operation of the machine; indicating means freely mounted in said compartment, but normally in a non-indicating position; a solenoid mounted on the compartment; an armature in said solenoid; means intermediate the armature and the indicator whereby the indicator is flexibly operated upon operation of said means; means under control of said manipulative device for energizing the solenoid to move the armature to actuate said intermediate means to operate the indicating means to indicate to the operator that the record should be filed in that compartment; and means including a delayed action solenoid holding circuit conditioned for operation by the machine during a machine operation and rendered operable by the machine near the end of a machine operation for retaining the solenoid energized for a predetermined time after the end of the machine operation for retaining said indicating means in its indicating position subsequent to the end of the machine operation.

2. In a machine according to claim 1, wherein the delayed action solenoid holding circuit for retaining the indicating means in its indicating position comprises a solenoid conditioned for operation by the machine and in circuit with the first-mentioned solenoid, and which is rendered operable by the machine to hold the first-mentioned solenoid energized a predetermined time subsequent to the end of the operation of the machine.

3. An indicating mechanism for a sorting device having a filing compartment adapted to receive manually sorted record material, consisting of the combination of a machine; a manipulative device to control the operation of the machine; indicating means freely mounted in said compartment, but normally in a non-indicating position; a solenoid mounted on the compartment; an armature in said solenoid; means intermediate the armature and the indicator whereby the indicator is flexibly operated on operation of said means; means under control of said manipulative device for energizing the solenoid to move the armature to actuate said intermediate means to operate the indicating means to indicate to the operator that the record should be filed in that compartment; and means including a delayed action solenoid holding circuit having a capacitor which is charged during a machine operation and discharged through a control relay of the end of the machine operation for maintaining said solenoid in an energized condition to retain the indicating means in its indicating position subsequent to the end of the machine operation.

4. In a machine according to claim 3, characterized by the fact that the means maintaining the first mentioned solenoid in an energized condition to retain the indicating means in its indicating position subsequently to the end of the machine operation, comprises a condenser in circuit with the solenoid, and which is charged by the machine operation to energize a second solenoid to create a holding circuit for the first mentioned solenoid during the discharging of the condenser.

5. An indicating mechanism for a sorting device having a filing compartment adapted to receive manually sorted record material, consisting of the combination of a machine; operating means therefor; a manipulative device; indicating means freely mounted in said compartment but normally in a non-indicating position; a solenoid mounted on the compartment; an armature in said solenoid; means intermediate the armature and the indicator whereby the indicator is flexibly operated upon operation of said means; means under control of said manipulative device for energizing the solenoid to move the armature to actuate said intermediate means to operate the indicating means to indicate to the operator that the record should be filed in that compartment; means to release the manipulative device and thereby disable its control of the solenoid; and means including a delayed action circuit comprising a capacitor charged by the machine operation; a switch operable by the machine; a second solenoid operable by the discharge of the capacitor, and a switch actuated by said second solenoid to supersede the control of the manipulative device over the first mentioned solenoid prior to the release of said manipulative device to retain the indicating means in an indicating position by said first mentioned solenoid subsequent to the end of the machine operation.

6. An indicating mechanism for a sorting device having a filing compartment adapted to receive manually sorted record material, consisting of the combination of a machine; a main operating shaft therefor; a manipulative device to control operation of said machine; indicating means freely mounted in said compartment but normally in a non-indicating position; a solenoid mounted on the compartment; an armature in said solenoid; means intermediate the armature and the indicator whereby the indicator is flexibly operated upon operation of said means; means under control of said manipulative device for energizing the solenoid to move the armature to actuate said intermediate means to operate the indicating means to indicate to the operator that the record should be filed in that compartment; means to release the manipulative means to disable its control over said solenoid; a plurality of switching mechanisms in circuit with said solenoid; means actuated by the main operating shaft to operate one of the switching mechanisms to create a holding circuit for said solenoid; and means actuated by the machine to actuate another of said switching mechanisms to control said holding circuit to maintain the solenoid in an energized condition to in turn retain the indicating means in its indicating position subsequent to the end of the machine operation.

7. In a machine, according to claim 6, characterized by the fact that the means which is operated by the machine to actuate another of said switching means to control said holding circuit includes a capacitor and a solenoid controlled thereby to actuate a third switching mechanism to retain the indicating means in indicating position subsequently to the end of the machine operation.

References Cited in the file of this patent

UNITED STATES PATENTS

| Number | Name | Date |
|---|---|---|
| 979,353 | Sullivan | Dec. 20, 1910 |
| 2,068,719 | Troutman | Jan. 26, 1937 |
| 2,343,268 | Wheeler | Mar. 7, 1944 |
| 2,416,598 | Spurlino et al. | Feb. 25, 1947 |